Oct. 6, 1925.
A. BUSEMANN
APPARATUS FOR DETERMINING THE TORSIONAL OSCILLATORY
STRENGTH OF MATERIALS FOR ENGINEERING
Filed March 1, 1924
1,556,201
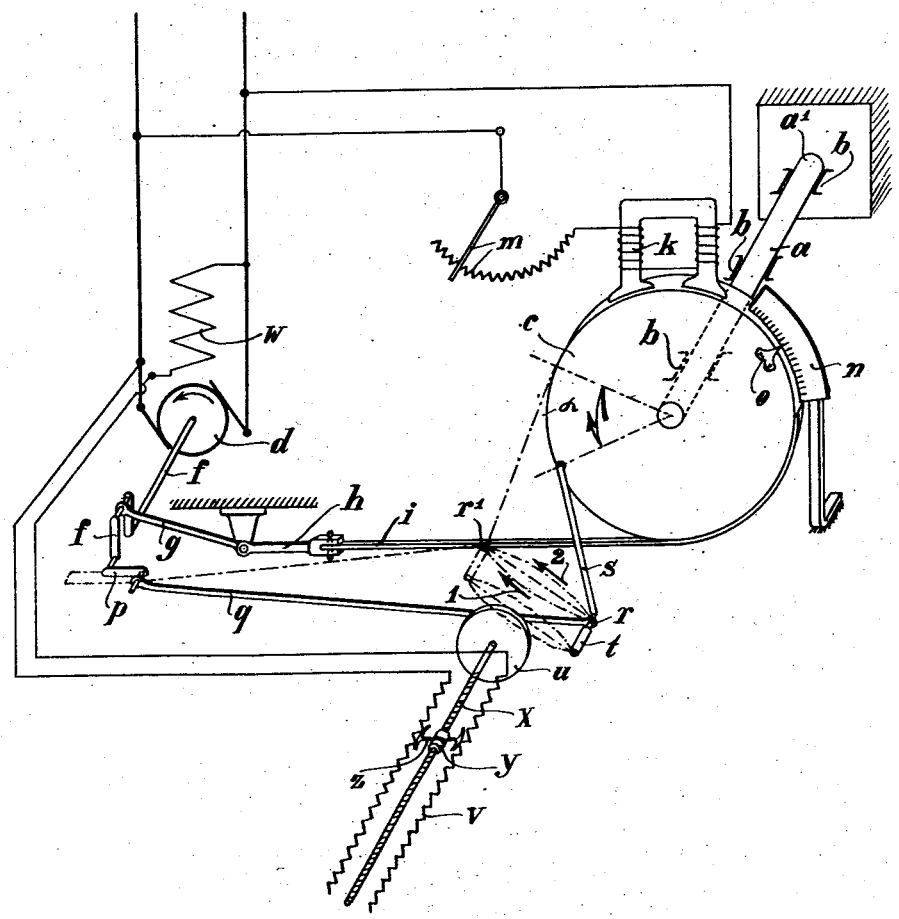
Inventor:
Adolf Busemann
by Fritz Keunecke
Attorney.

Patented Oct. 6, 1925.

1,556,201

UNITED STATES PATENT OFFICE.

ADOLF BUSEMANN, OF BRUNSWICK, GERMANY.

APPARATUS FOR DETERMINING THE TORSIONAL OSCILLATORY STRENGTH OF MATERIALS FOR ENGINEERING.

Application filed March 1, 1924. Serial No. 696,329.

*To all whom it may concern:*

Be it known that I, ADOLF BUSEMANN, engineer, a citizen of the German Republic, and residing at Brunswick, Germany, have invented certain new and useful Improvements in Apparatus for Determining the Torsional Oscillatory Strength of Materials for Engineering, for which I have filed an application for patent in Germany on Febr. 26, 1923, and of which the following is a specification.

This invention relates to a method and apparatus for determining the torsional oscillatory strength of materials for engineering, for example, of shafts. The term "torsional oscillatory strength" means the limiting or maximum value of the oscillatory torsional strain which may be borne by the trial-rod without breaking, either for a given number of oscillations or for an indefinite number. At the same time the invention permits of the determination of the damping capacity of the material, i. e. the capacity to reduce or consume the energy by internal friction, this capacity being of great consequence to shafts which are under oscillatory torsional strain.

The new method is hereinafter fully explained in connection with an apparatus for carrying the method into practice, reference being made to the annexed drawing which illustrates, by way of example, a diagram of the said apparatus.

In the drawing: $a$ is a rod or shaft the torsional oscillatory strength of which is to be determined. This shaft is rotatably mounted in bearings $b$, $b$ which prevent the shaft from being bent. One end of the shaft $a$ is held fast or fixed, as at $a^1$, while at the other end a flywheel mass, for example, a disc $c$, is fastened to the shaft. Shaft $a$ and flywheel mass $c$ form together a system capable of oscillatory motion. On this system a periodic impulse is to be exerted, which must be timed in exact agreement with the natural oscillation of the system $a$, $c$. Said impulse is produced by a crank $f$ directly driven by an electric motor $d$ and resiliently coupled to the system $a$, $c$ by means of a connecting rod $g$, a draw rod $h$ and a flexible and resilient intermediate link $i$, for example, a band of india rubber which is fastened at one end to the said draw rod $h$ and at the other end to the periphery of the disc $c$. The electric motor which is constructed as a shunt motor is so controlled that the number of revolutions of the crank $f$ agrees with the period of natural oscillation of shaft $a$ and flywheel mass $c$, which period may be arithmetically determined, or with other words, that the oscillation of the system $a$, $c$ and the impulse are tuned to resonance. Thus the system $a$, $c$ oscillates with its natural frequency, the amplitudes depending on the strength of the impulse. Because of the trifling internal resistance, only a very small impulse is necessary for maintaining the oscillation of shaft $a$ and disc $c$ when tuned in resonance. Consequently, the adjustment of the strength of the impulse is very difficult. To avoid this difficulty, the energy required for maintaining the oscillation is artificially increased by braking the oscillatory system. To this end, a brake $k$ acting upon the disc $c$ is arranged, this brake being preferably of magnetic type so that its braking force may be regulated by many steps. In the example shown, an eddy-current brake $k$ is provided, the braking effect of which can be regulated by means of stepped resistance $m$. By the aid of this brake it is possible to vary the demand for energy, which is equivalent to a regulation of the strength of the impulse. Thus the amplitude of oscillation can be increased and decreased at will.

The torsional oscillatory strength of the shaft $a$ is determined in the following manner. The system $a$, $c$ is set in oscillatory motion by means of the crank-gear $f$, $g$, $h$, $i$ while at the same time the period of the impulse is tuned in resonance with the period of the natural oscillation of the system by regulating the number of revolutions of the crank $f$. Shaft $a$ and flywheel mass $c$ oscillate now with their natural frequency, the amplitude $\alpha$ being at first held constant by means of the brake $k$. After a certain number of oscillations, say 1,000,000, the strength of the impulse is increased or, what is the same, the effort of the brake $k$ is reduced and thus the amplitude $\alpha$ increased. This procedure is continued step by step until the shaft $a$, on arrival of a certain amplitude of oscillation, breaks. The amplitude preceding that amplitude upon which the shaft became broken represents the maximum value of oscillatory torsional strain which does not yet cause a breakage of the shaft. The actual amplitude $a$ can be read from a fixed scale $n$ on which plays a pointer $o$ fastened to the disc $c$. By measuring the heat produced in the shaft $a$ by internal friction during the oscillatory movement the damping capacity of the material of the shaft $a$ can be determined at the same time.

When there is resonance between the impulse and the oscillation a phase-displacement about an angle of 90° takes place between the exciter of oscillation and the oscillation itself. However, as soon as the number of revolutions of the driving crank $f$ differs from the frequency of oscillation of shaft $a$ and flywheel mass $c$, the phase angle alters. According to the invention, this alteration of the phase angle is utilized for regulating the number of revolutions of the motor $d$, that is to say, to tune the number of revolutions of the crank $f$ to the natural frequency of oscillation of the system $a$, $c$. To this purpose, on the one hand, a second crank $p$ connected with a rod $q$ is arranged on the shaft $f^1$ of the driving crank $f$, while, on the other hand, a rod $s$ which in its turn is coupled to the rod $q$ by means of a link-pin $r$ is pivoted to the disc $c$ in such a manner, that the disc $c$ and the rod $s$ form together a crank gear the working direction of which stands at a right angle to the working direction of the crank gear $p$, $q$. According to the phase-displacement which occurs on resonance between the impulse produced by the crank gear $f$, $g$, $h$, $i$ and the oscillation of the system $a$ $c$, the crank $p$ is arranged with respect to the crank $f$ at an angle of 90°.

When the number of revolutions of the crank-shaft $f^1$ agrees with the frequency of oscillation of the system $a$, $c$, that is to say, on resonance between impulse and oscillation, the axle of the link pin $r$ connecting the rods $q$ and $s$ travels on the straight line $r$, $r^1$. When, however, the number of revolutions of the shaft $f^1$ differs from the natural frequency of oscillation of shaft $a$ and flywheel mass $c$, the link pin $r$ moves along the circumference of an ellipse, the longitudinal axis of which coincides with the said line $r$, $r^1$. If the number of revolutions of the shaft $f^1$ if greater than the frequency of the oscillations of the system $a$, $c$ the pin $r$ travels on the circumference of the ellipse in the direction of the arrow 1, i. e. clockwise, whereas it travels counter-clockwise, i. e. in the direction of the arrow 2, when the number of revolutions of the shaft $f^1$ is smaller than the frequency of oscillation. The link-pin $r$ carries a resilient finger $t$, for example a finger made of india rubber, said finger being adapted to co-act with the switch wheel $u$ of a very fine stepped resistance $v$ is connected in series with the field-winding $w$ of the motor $d$. The wheel $u$ is fixed to the end of a rotatable, but non-displaceable screw-spindle $x$ which moves a non-rotatable screw-nut $y$ and a contact bridge $z$ fixed thereto. As long as the link-pin $r$ is travelling on the straight line $r$, $r^1$, the finger $t$ passes clear of the wheel $u$. When however, the number of revolutions of the electric motor $d$ is larger or smaller than the frequency of oscillation of the shaft $a$ and mass $c$, the finger $t$, owing to the link-pin $r$ travelling on the circumference of an ellipse, turns the wheel $u$ in the one direction or the other as the case may be, thereby increasing or reducing the resistance $v$. Thus the field $w$ of the electric motor $d$ is weakened or strengthened until the necessary resonance between impulse and oscillation is again obtained, whereupon the finger $t$ ceases to act upon the resistance $v$.

The impulse for maintaining the oscillation of the system $a$, $b$, obviously, may also be exerted at the end $a^1$ of the shaft $a$ instead of at the periphery of the flywheel, and the electric motor $d$ may be replaced by another motive power, for example by a steam-engine. In the latter instance, the spindle $y$ when turned by means of finger $t$ and wheel $u$ may adjust a throttle valve controlling the supply of steam to the engine cylinder. Furthermore, when using an electric motor, the number of revolutions of the latter may be regulated, instead of by weakening or strengthening the field, also by varying the voltage of the electric current before the motor, by means of a fine stepped resistance.

As is evident from the above description, the new apparatus is fitted to so control an electric motor or other engine that its number of revolutions remains always constant. Therefore, the apparatus may not only be used for determining the torsional oscillatory strength of materials, but also to regulate the number of revolutions of any driving motor for any purpose, for example of a prime mover for electric current generators.

Claims:

1. A device for determining the torsional oscillatory strength of test rods, comprising in combination, means for fixedly securing one end of a test rod, means for preventing the rod from bending, a weight adapted to be fixed to the free end of the rod, so that the rod and weight form a system capable of oscillation, mechanical means for exerting on said system periodic impulses in resonance with the period of natural oscillation of said system, and means for controlling the amplitude of oscillation of said system.

2. A device for determining the torsional oscillatory strength of test rods, comprising in combination, means for fixedly securing one end of a test rod, means for preventing the rod from bending, a weight adapted to be fixed to the free end of the rod, the rod and weight then forming a system capable of free oscillation, eccentric means for mechanically exerting on said system periodic impulses in resonance with the period of natural oscillation of said system, and means for controlling the amplitude of oscillation of said system.

3. An appliance for determining the torsional oscillatory strength of test rods for engineering, comprising in combination: bearings for rotatably mounting a test rod and preventing the same from bending, means to fix one end of the rod, a flywheel mass adapted to be fastened to the other end of the rod, whereby the rod and said mass thus form a system capable of oscillation, a crank-shaft and a crank-gear for exerting a periodic impulse on said system, said crank gear being coupled to said system by means of a resilient intermediate link, and means for rotating the crank-shaft with a number of revolutions agreeing with the natural frequency of oscillation of said system.

4. An appliance for determining the torsional oscillatory strength of test rods for engineering, comprising in combination: bearings for rotatably mounting a test rod and preventing the same from bending, means to fix one end of the rod, a flywheel mass adapted to be fastened to the other end of the rod, whereby the rod and said mass thus form a system capable of oscillation, a crank-shaft and a crank-gear for exerting a periodic impulse on said system, said crank-gear being coupled to said system by means of a resilient intermediate link, means for rotating the said crank shaft with a number of revolutions agreeing with the natural frequency of oscillation of said system, and a brake for regulating the amplitude of oscillation.

5. An appliance for determining the torsional oscillatory strength of test rods for engineering, comprising in combination: bearings for rotatably mounting a test rod and preventing the same from bending, means to fix one end of the rod, a flywheel mass adapted to be fastened to the other end of the rod, whereby the rod and said mass thus form a system capable of oscillation, a crank-shaft, a driving crank and connecting rods for exerting a periodic impulse on said system, said connecting rods being coupled to said system by means of a resilient intermediate link, a motor for rotating said crank-shaft, a second crank on said crank-shaft arranged at an angle to said driving crank, a rod connected to said crank, a second rod pivotally connected to said flywheel mass, a link-pin coupling said two rods together, a regulator for said driving motor, a switch wheel for said regulator, and a resilient finger on said link-pin for rotating said switch wheel.

6. An apparatus for determining the torsional oscillatory strength of test rods, comprising means adapted to engage a test rod at one of its ends to hold the rod fixed, a flywheel mass adapted to be fastened to the other end of the rod, a crank shaft, a driving crank and connecting rods for imparting a periodic impulse to the flywheel mass to produce twisting of its test rod, said connecting rods being coupled to the flywheel mass by means of a resilient intermediate link, a motor adapted to rotate said crank-shaft, a second crank on said crank-shaft arranged at an angle to said driving crank, a rod connected to said second crank, a second rod pivotally connected to the flywheel mass, a link-pin coupling said two rods together, a regulator for said driving motor, a switch wheel for said regulator, and a resilient finger on said link-pin for rotating said switch wheel.

ADOLF BUSEMANN.